United States Patent
Farmer et al.

(10) Patent No.: US 6,553,767 B2
(45) Date of Patent: Apr. 29, 2003

(54) GAS TURBINE COMBUSTOR LINER WITH ASYMMETRIC DILUTION HOLES MACHINED FROM A SINGLE PIECE FORM

(75) Inventors: Gilbert Farmer, Cincinnati, OH (US); Daniel D. Brown, Fairfield, OH (US); Myron E. Rutherford, Cincinnati, OH (US); Steven C. Vise, Cincinnati, OH (US); Jeffrey M. Martini, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 39 days.

(21) Appl. No.: 09/878,836

(22) Filed: Jun. 11, 2001

(65) Prior Publication Data

US 2002/0184893 A1 Dec. 12, 2002

(51) Int. Cl.⁷ .................................................. F02C 3/14
(52) U.S. Cl. ...................................... 60/752; 29/890.01
(58) Field of Search .......................... 60/804, 746, 747, 60/748, 752, 732; 29/890.01

(56) References Cited

U.S. PATENT DOCUMENTS

| | | | |
|---|---|---|---|
| 4,485,630 A | | 12/1984 | Kenworthy |
| 4,733,538 A | | 3/1988 | Vdoviak et al. |
| 5,220,795 A | | 6/1993 | Dodds et al. |
| 5,265,425 A | | 11/1993 | Howell |
| 5,279,127 A | | 1/1994 | Napoli |
| 5,289,687 A | * | 3/1994 | Kress et al. .................. 60/747 |
| 5,329,761 A | | 7/1994 | Ablett et al. |
| 5,335,491 A | * | 8/1994 | Barbier et al. .............. 60/39.37 |
| 5,375,420 A | * | 12/1994 | Falls et al. ..................... 60/747 |
| 5,413,647 A | | 5/1995 | Ablett et al. |
| 5,421,158 A | | 6/1995 | Stenger et al. |
| 5,575,146 A | | 11/1996 | Borkowicz et al. |
| 5,964,091 A | | 10/1999 | Fukui et al. |
| 5,970,716 A | | 10/1999 | Forrester et al. |
| 6,212,870 B1 | | 4/2001 | Thompson et al. |

* cited by examiner

Primary Examiner—Charles G. Freay
(74) Attorney, Agent, or Firm—Nathan D. Herkamp; Steven J. Rosen

(57) ABSTRACT

An annular gas turbine engine combustor liner has a single piece annular shell circumscribed about a first axis of revolution. The shell has a hot side and a cold side, an annular dilution hole section, and a plurality of asymmetrical cylindrical dilution holes extending through the section. Pockets are circumferentially interdigitated between the dilution holes and extend into the shell from the cold side such that the pockets form dilution hole bosses between the pockets through which the dilution holes extend. Each of the dilution holes is circumscribed about a second axis of revolution which is not parallel to the first axis of revolution. The liner may further include forward and aft annular cooling nuggets located forward and aft of the dilution hole section and having annular film cooling slots which are open in the axially aftwardly direction. The shell is machined from a single piece integrally formed near net shape form such as a forging, a casting, or more particularly a spin or centrifugal casting. The invention includes a method for making the annular gas turbine engine combustor liner by forming a single piece integrally formed near net shape form and machining it to produce the shell and the above features in the shell.

38 Claims, 7 Drawing Sheets

GAS TURBINE COMBUSTOR LINER WITH ASYMMETRIC DILUTION HOLES MACHINED FROM A SINGLE PIECE FORM

BACKGROUND OF THE INVENTION

1. Field of the Invention

This invention relates to gas turbine combustor liners with dilution holes, and more particularly, to combustor liners which are made from a single piece near net shape form such as a forging or a casting and having asymmetric cylindrical dilution holes machined in the liner.

2. Description of Related Art

Combustor liners are generally used in the combustion section of a gas turbine engine which is located between the compressor and turbine sections of the engine. Combustors generally include an exterior casing and interior combustor radially inner and outer liners between which fuel is burned producing a hot gas usually at an intensely high temperature such as 3,000 degrees F. or even higher. To prevent this intense heat from damaging the casing structure before it exits to a turbine, a combustor liner is provided in the interior of the combustor. The combustor liner prevents the intense combustion heat from damaging the surrounding engine. Various cooling techniques are used to cool the liner such as film cooling.

Gas turbine engines often have a dilution air zone in the combustor immediately downstream of a flame zone. Dilution air is injected into the combustor to control the temperature of the hot gases before they enter the nozzle on their way to the turbine blades. Dilution air is injected into the combustion zone through dilution holes in the liner to control the temperature of hot gases in the combustor. This has conventionally been handled by injecting dilution air into the hot gases well upstream of the outlet of the combustor in order to ensure thorough mixing and cooling prior to entry into the nozzle. In short combustors, this method of controlling the temperature of the hot gases is not satisfactory in every respect. Dilution hole rings and bosses have been used to inject the dilution air into the dilution air zone which is conventionally located directly downstream of the fuel injectors and upstream of the outlet of the combustor. One type of dilution hole ring is illustrated in U.S. Pat. No. 6,212,870 on the inner combustor liner (numeral 18 in FIG. 1 of the patent) and is illustrative of the inner combustor liner used on the GE90 aircraft gas turbine engine.

A cooling air film along the walls of the combustor liner is often used to cool the liner. Techniques for cooling the liner include nuggets formed in the liner and having film cooling air slots open in an axially aftward direction (downstream) to help produce an cooling air film. Multi-hole film cooling holes are also used for film cooling the liner.

One engine produced by the General Electric Company has 60 dilution hole rings which are welded into the GE90 inner combustor liner. The dilution hole rings or bosses have an aerodynamic purpose which is to provide improved altitude ignition performance and they prevent penetration of the dilution air into the inner swirler recirculation zone, which would reduce altitude ignition capability. The dilution hole rings redirect the inner liner primary dilution away from the inner swirler recirculation zone, thus, allowing altitude ignition capability. The present dilution hole rings are fabricated from barstock and TIG welded into holes in the inner liner. Each weld must be inspected using florescent penetration and also x-rayed. Distortion due to the welding requires that each liner be resized to restore the liner to its original contour and dimensions. The complex shapes and machining required to produce these liners negatively effects their cost.

SUMMARY OF THE INVENTION

An annular gas turbine engine combustor liner has an axially extending single piece annular shell circumscribed about a first axis of revolution. The shell has a hot side and a cold side, an annular dilution hole section, and a plurality of asymmetrical cylindrical dilution holes extending through the section. An exemplary embodiment of the invention includes pockets circumferentially interdigitated between the dilution holes and extending into the shell from the cold side such that the pockets form dilution hole bosses between the pockets through which the dilution holes extend. Each of the dilution holes is circumscribed about a second axis of revolution which is not parallel to the first axis of revolution. The cold side is a first frusto-conical surface having a first conical angle with respect to the first axis, the hot side is a second frusto-conical surface having a second conical angle with respect to the first axis, and the first and second conical angles have different values. In the exemplary embodiment of the invention, the dilution hole section thickens in an axially aftwardly direction. The liner may further include forward and aft annular cooling nuggets located forward and aft of the dilution hole section and having annular film cooling slots which are open in the axially aftwardly direction. The shell is machined from a single piece integrally formed near net shape form such as a forging or a casting or, in a more particular embodiment, a centrifugal casting.

The invention includes a method for making the annular gas turbine engine combustor liner and the method includes forming a single piece integrally formed near net shape form for the axially extending single piece annular shell circumscribed about the first axis of revolution then machining the annular shell having a hot side and a cold side and the annular dilution hole section of the shell, and then drilling the plurality of asymmetrical cylindrical dilution holes extending through the section. An exemplary embodiment of the invention includes machining the pockets to be circumferentially interdigitated and centered between where the dilution holes are to be drilled before drilling of the dilution holes. The pockets are machined into the shell from the cold side such that the pockets form dilution hole bosses centered between the dilution holes. Machining the annular shell includes machining the dilution hole section to be frusto-conical in shape such that the cold side is a first frusto-conical surface having a first conical angle with respect to the first axis and the hot side is a second frusto-conical surface having a second conical angle with respect to the first axis, and the first and second conical angles have different values. The shell is machined such that the dilution hole section thickens in an axially aftwardly direction. Forward and aft annular cooling nuggets forward and aft of the dilution hole section are machined into the shell including annular film cooling slots which are open in the axially aftwardly direction in the nuggets. The near net shape form is made by forging or casting or, in a more particular embodiment, by centrifugal or spin casting.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
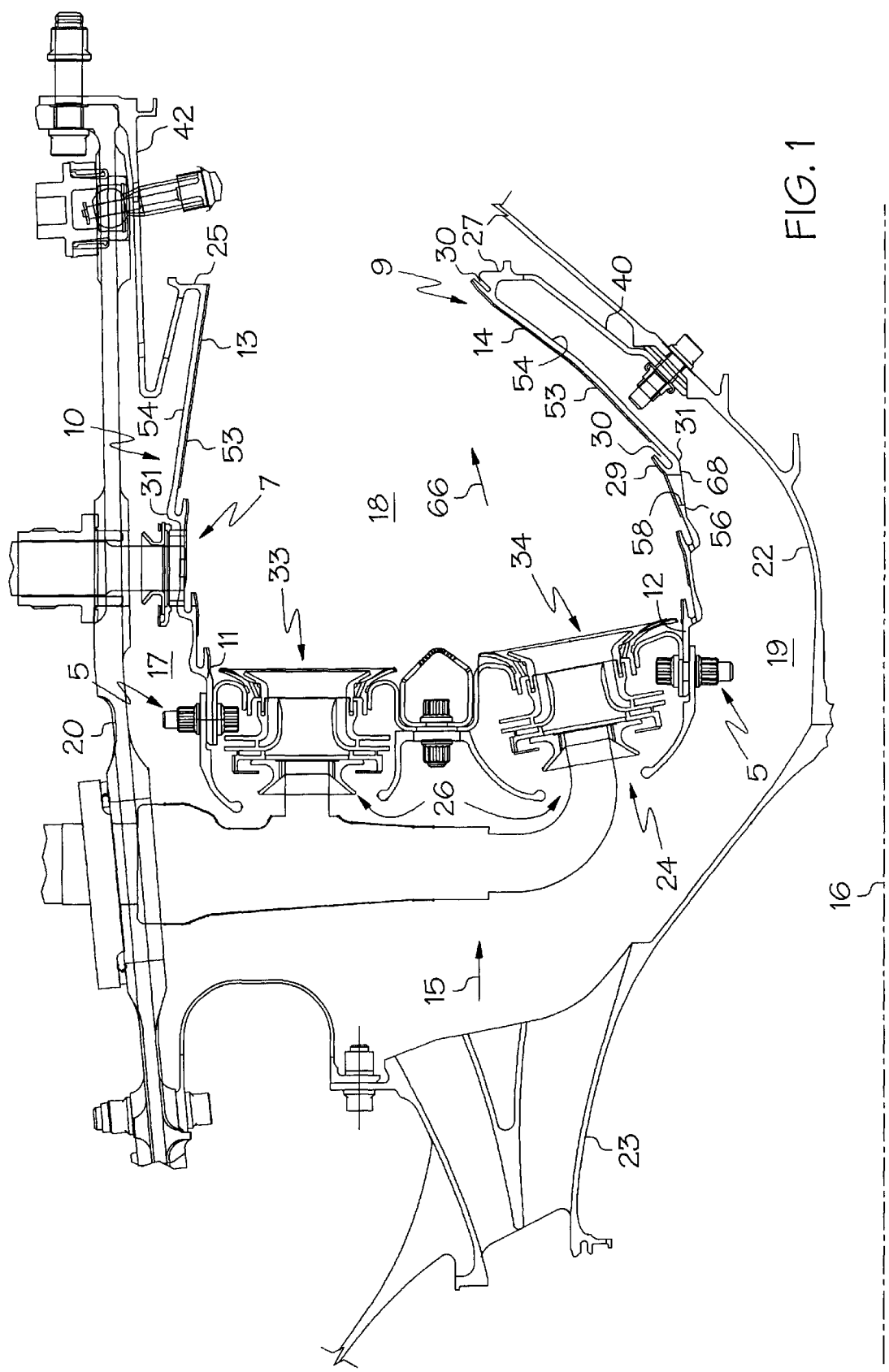
FIG. 1 is a schematic, longitudinal sectional view illustration of an exemplary combustor having a combustor liner assembly and combustor liner of an exemplary embodiment of the present invention.

Illustrated in FIG. 1 is an exemplary double annular combustor 10 for an aircraft turbofan gas turbine engine. The combustor 10 includes annular radially outer and inner combustion liners 13 and 14, respectively, disposed coaxially about a longitudinal centerline axis 16 of the combustor and spaced radially apart and having an annular combustion zone 18 therebetween. Outer and inner combustion liner assemblies 7 and 9 are constructed from the outer and inner combustion liners 13 and 14 and have respective outer and inner aft ends 25 and 27 which are connected to annular outer and inner casings 20 and 22, respectively, by annular inner and outer supports 40 and 42. The outer and inner combustion liners 13 and 14 have hot sides 53 and cold sides 54. The hot sides 53 are designed and constructed to face the combustion zone 18 and the cold sides 54 are designed and constructed to face away from the combustion zone.

An annular combustor dome assembly 24 is connected to outer and inner liner upstream or forward ends 11 and 12 of the outer and inner combustion liners 13 and 14, respectively, by bolts 5. The combustor dome assembly 24 is illustrated as having radially outer and inner domes 33 and 34, respectively. The outer and inner casings 20 and 22 together with the outer and inner combustion liners 13 and 14 defines outer and inner passages 17 and 19, respectively, which are adapted to deliver compressed air in a downstream flow 15 from a compressor (not illustrated) though a diffuser 23. The compressed air in the downstream flow 15 from diffuser 23 passes principally into annular opening 26 to support combustion and partially to passages 17 and 19 where it is used to cool the outer and inner liners 13 and 14. The outer and inner liners 13 and 14 have cooling nuggets 31 and apertures 28 (illustrated in FIG. 2) through the nuggets leading into annular film cooling slots 29 having downstream openings 30 in the nuggets. The compressed air in the downstream flow 15 in the outer and inner passages 17 and 19 is used for cooling air and is passed through the apertures 28 and into the annular film cooling slots 29 to help provide film cooling over the hot sides 53 of the outer and inner liners 13 and 14. Downstream angled multi-hole film cooling holes 44 through the outer and inner combustion liners 13 and 14, respectively, provide additional film cooling on the hot side 53 of the liners with cooling air from the outer and inner passages 17 and 19. Multi-hole film cooling holes 44 are well known in the art and are very much smaller than illustrated in the FIGS. which is done for the purpose of clarity. Disposed between and interconnecting outer and inner liners 13 and 14 near their upstream ends, are outer and inner domes 33 and 34, respectively, which preferably are separate and distinct domes. Outer and inner domes 33 and 34 are attached to the outer and inner liners 13 and 14 respectively by way of bolts (as illustrated herein), brazing, or the like.

Figure 2:
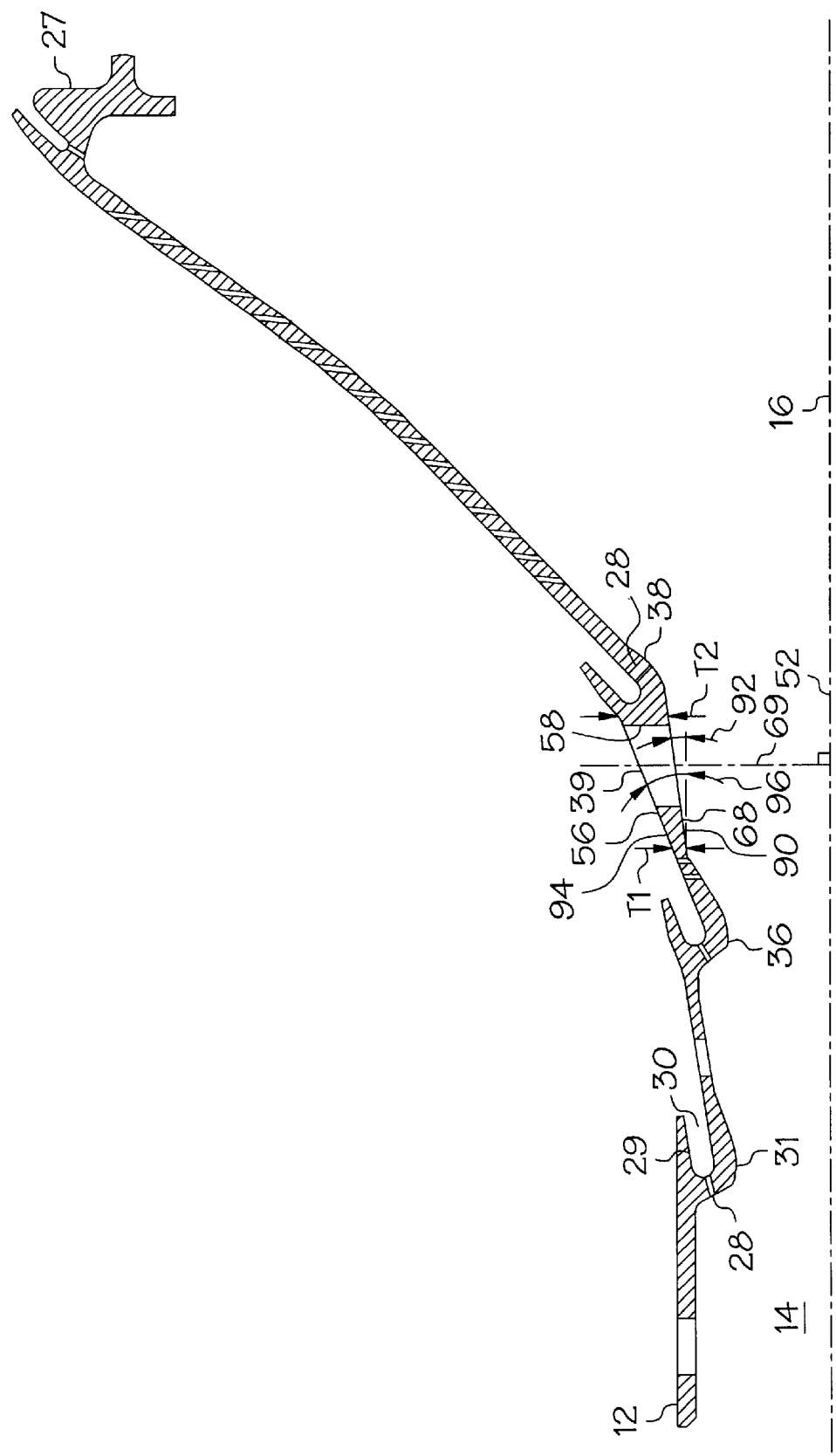
FIG. 2 is a sectional view illustration of a combustor inner liner in the combustor illustrated in FIG. 1.
Figure 3:
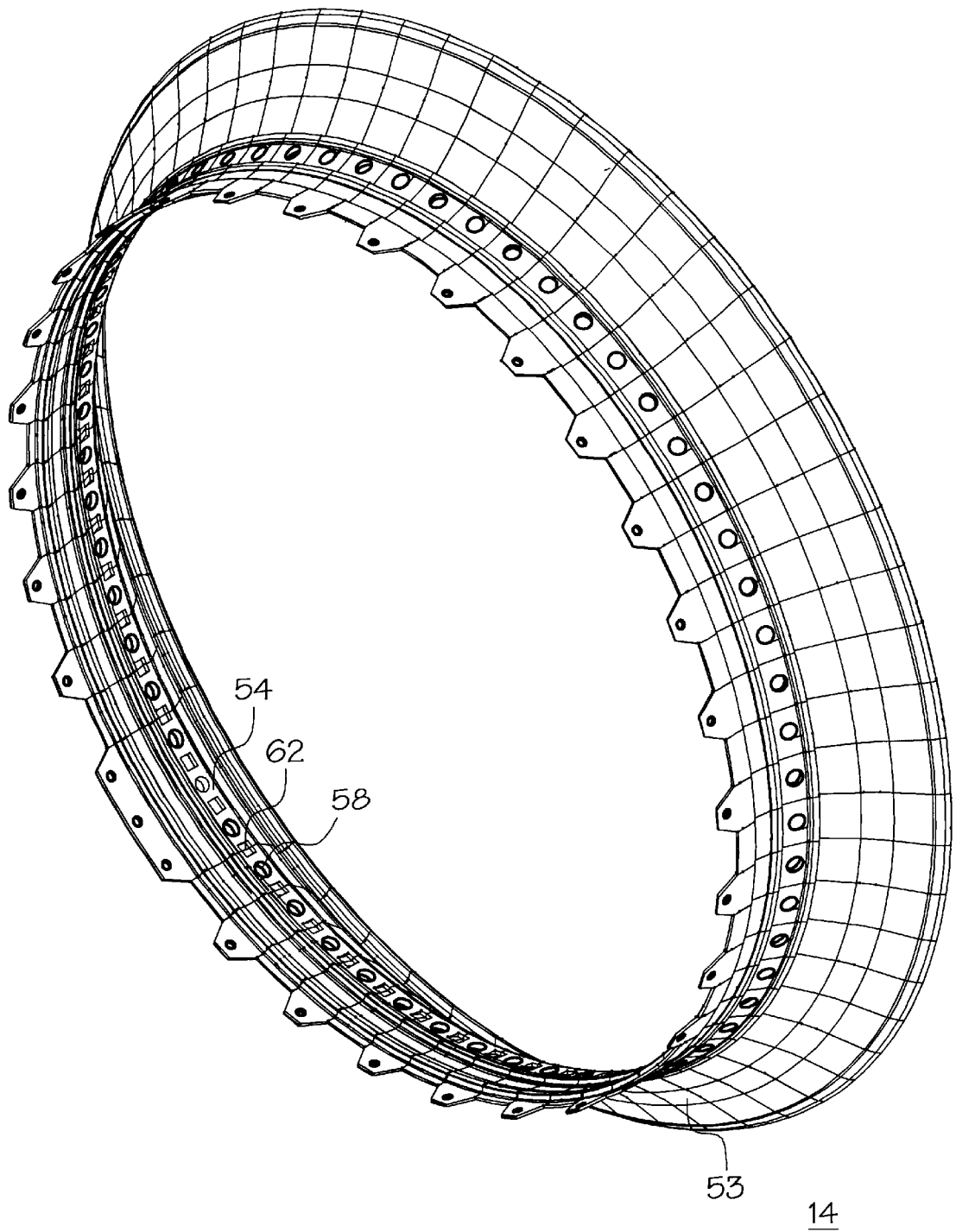
FIG. 3 is a perspective wire frame view illustration of inner liner illustrated in FIGS. 1 and 2.
Figure 4:
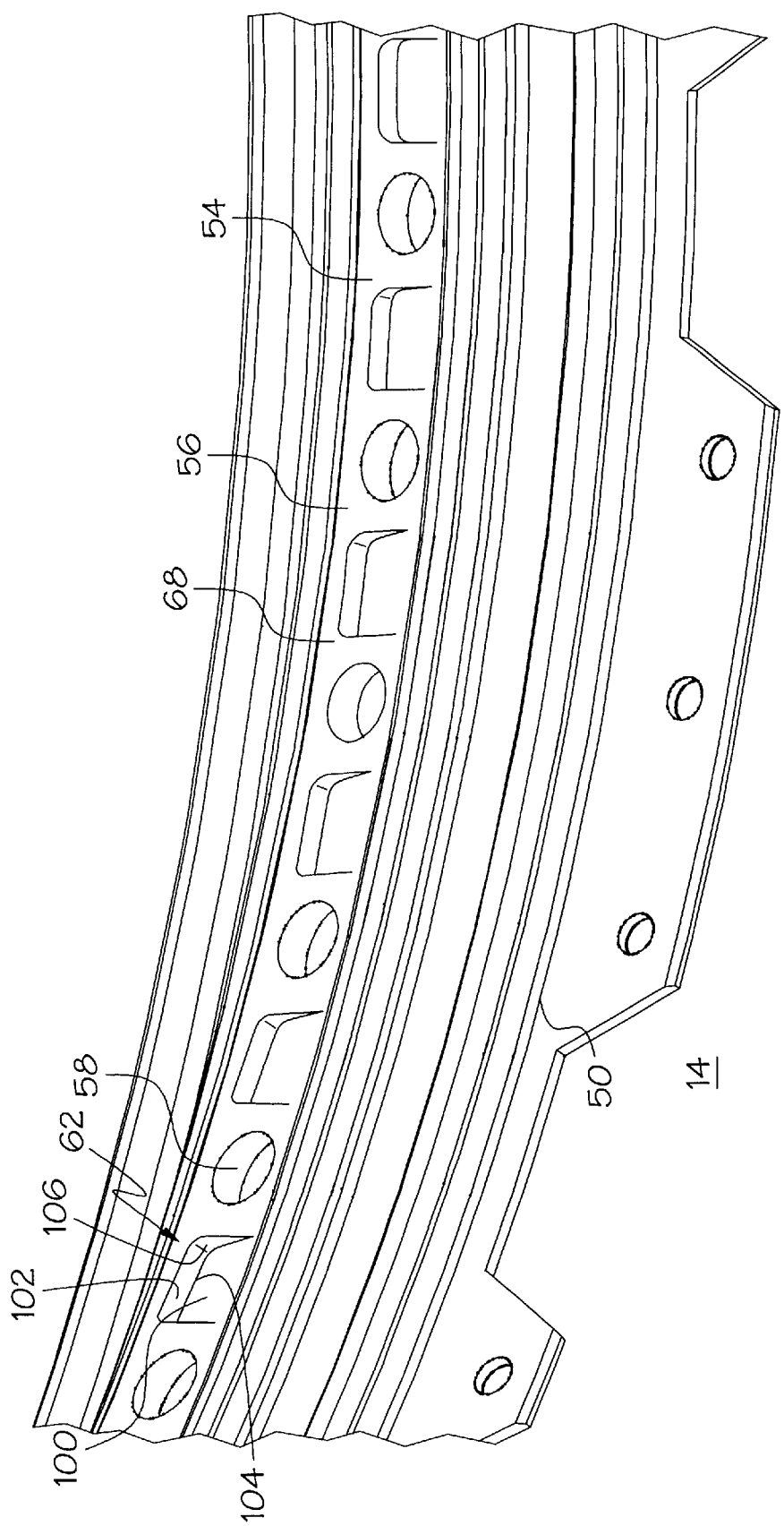
FIG. 4 is an enlarged perspective view illustration looking radially outwardly at a cold side of a part of the inner liner illustrated in FIG. 3.

Illustrated in FIGS. 2, 3, and 4 is the inner liner 14 having an axially extending single piece annular shell 50 circumscribed about a first axis of revolution 52 which in the exemplary embodiment of the invention is the centerline axis 16. The shell 50 includes the hot side 53 and the cold side 54 and the annular dilution hole section 56 which thickens in the downstream or an axially aftwardly direction 66 which is generally the same direction as the downstream flow 15 from a compressor. The annular section 56 is frusto-conical in shape in the exemplary embodiment of the invention illustrated herein. The thickening of the section 56 in the axially aftwardly direction 66 is indicated by a first thickness T1 and an axially aftwardly spaced apart second thickness T2 of the section 56 which is greater than T1. Forward and aft cooling nuggets 36 and 38 are located forward and aft respectively of the dilution hole section 56. Referring to FIG. 2, a plurality of asymmetrical cylindrical dilution holes 58 extend through the annular dilution hole section 56. Referring to FIG. 4, a plurality of pockets 62 are circumferentially interdigitated between the dilution holes 58 and extend into the shell 50 from the cold side 54 such that the pockets form dilution hole bosses 68 between the pockets and the dilution holes extend though the bosses.

Referring back to FIG. 2, in the exemplary embodiment of the invention illustrated herein, each of the dilution holes 58 is circumscribed about a second axis of revolution 69 which is not parallel to the first axis of revolution 52. The second axis of revolution 69 is illustrated as being perpendicular to the first axis of revolution 52. The cold side 54 is a first frusto-conical surface 90 having a first conical angle 92 with respect to the first axis, the hot side 53 is a second frusto-conical surface 94 having a second conical angle 96 with respect to the first axis, and the first and second conical angles have different values. In the exemplary embodiment of the invention illustrated herein, the first conical angle 92 is less than the second conical angle 96. The asymmetrical dilution holes 58 as illustrated herein as having a planar exit 39 of the hole on the cold side 54 at an angle other than 90 degrees to the second axis of revolution 69.

Figure 5:
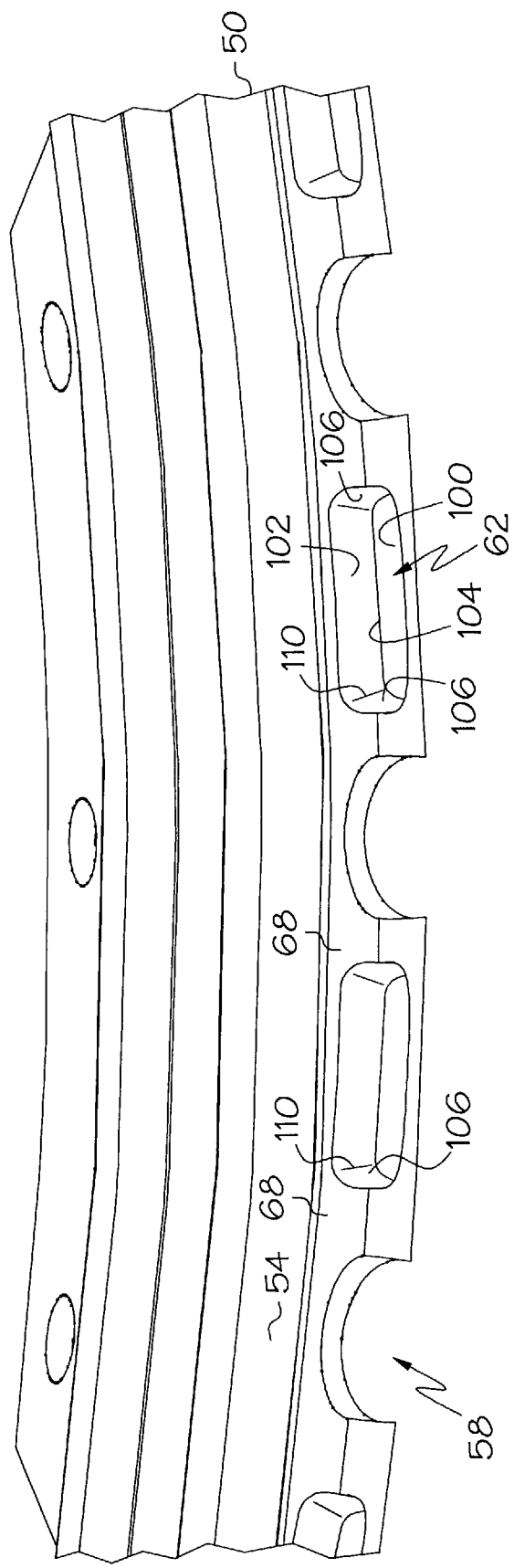
FIG. 5 is a perspective view illustration looking radially outwardly and circumferentially cut through dilution holes in the part of the inner liner illustrated in FIG. 4.
Figure 6:
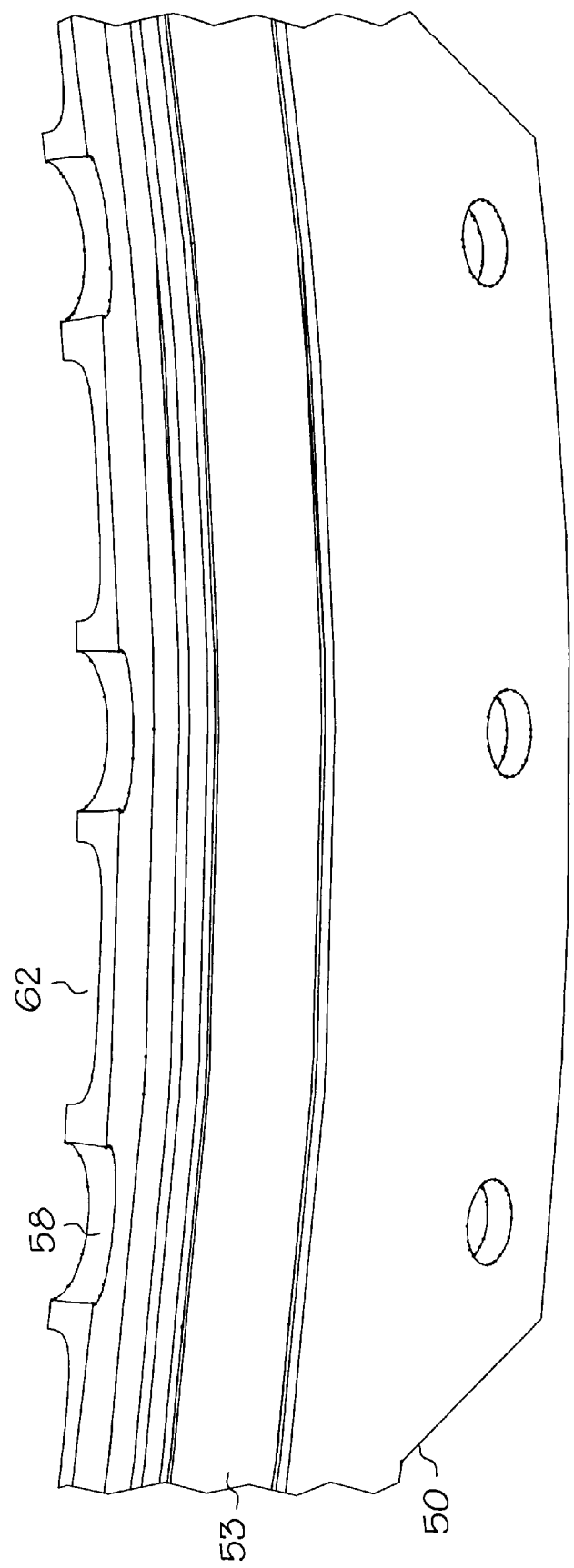
FIG. 6 is a perspective view illustration looking radially inwardly at a hot side of a part of the inner liner illustrated in FIG. 5.

Referring to FIGS. 4, 5 and 6, the dilution holes 58 extend through the bosses 68. In the exemplary embodiment as illustrated in FIGS. 4 and 5, each of the pocket 62 has a ramp 100 that slants into the shell 50 in the axially aftwardly direction 66 from the cold side 54 of the shell. This forms an aft wall 102 at an aft end 104 of the ramp 100 and circumferentially spaced apart pocket sides 106 extending axially forwardly from the aft wall. Pocket corners 110 between the aft wall 102 and the pocket sides 106 are spherically rounded. The dilution hole bosses 68 are circumferentially bounded by the circumferentially spaced apart pocket sides 106.

Figure 7:
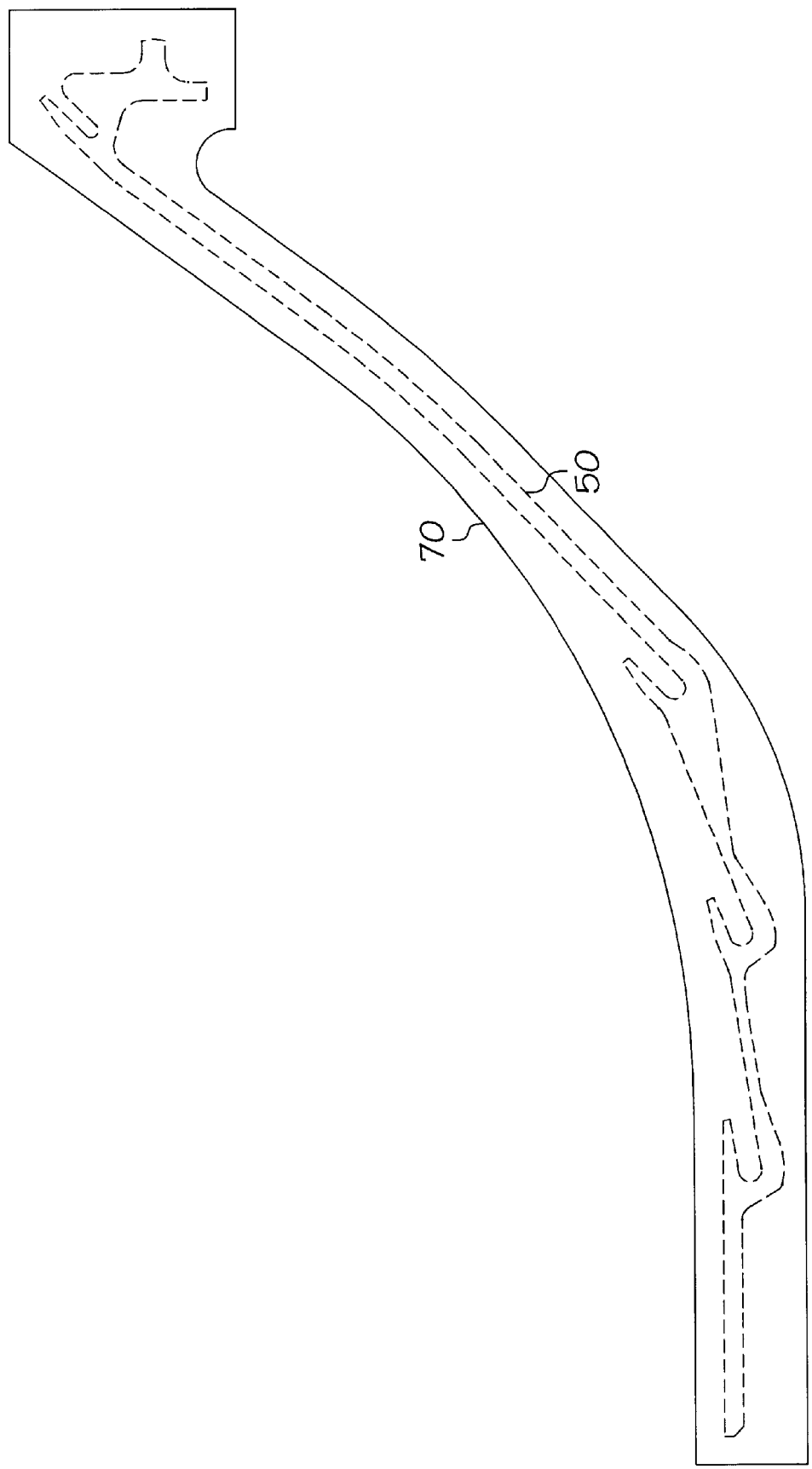
FIG. 7 is a sectional view illustration of a near net shape form from which a shell of the combustor inner liner illustrated in FIG. 2 is machined.

The configuration of the shell 50 allows it to be machined from a single piece integrally formed near net shape form 70 which is illustrated in FIG. 7. One near net shape form 70 is a forging. Alternatively, the near net shape form 70 may be a casting and one more particular form is a spin or centrifugal casting. Forging, casting, and centrifugal casting are three examples of methods of the present invention used to form the near net shape form 70. After the near net shape 70 is formed, it is machined down to the shell 50 which is illustrated in dotted line in FIG. 7. Then the shell 50 is placed in a milling machine which is used to machine the pockets 62 into the annular section 56 of the shell 50. The machining or cutting is performed inwardly from the cold side 54 of the shell 50. One pocket 62 is circumferentially cut between each two adjacent ones of the dilution holes 58 and the pocket extends into the shell 50 such that the pockets form dilution hole bosses 68 between the pockets. The pockets 62 are machined as circumferentially wide as possible to minimize the material of the bosses 68 between the pockets and the dilution holes 58.

After the near net shape form 70 is machined down to the shell 50, various features such as the cooling nuggets 31 and the film cooling slots 29 are machined into the shell. The pockets 62 are machined with ball end milling tooling which provides the spherical shape of the corners 110. In one embodiment of the invention, the pockets 62 are rough machined out with an axial ball milling operation using a one-half inch ball end milling tool. After the milling operations, the dilution holes 58 are drilled in such as with a laser drilling operation. The apertures 28 through the cooling nuggets 31 are also then drilled as are the downstream angled multi-hole film cooling holes 44 through the shell 50.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

While the preferred embodiment of our invention has been described fully in order to explain its principles, it is understood that various modifications or alterations may be made to the preferred embodiment without departing from the scope of the invention as set forth in the appended claims.

What is claimed is:

1. An annular gas turbine engine combustor liner comprising:
    an axially extending single piece annular shell circumscribed about a first axis of revolution,
    said shell having a hot side and a cold side,
    an annular dilution hole section of said shell,
    a plurality of asymmetrical cylindrical dilution holes extending through said section, and
    pockets circumferentially interdigitated between said dilution holes and extending into said shell from said cold side.

2. A liner as claimed in claim 1, wherein each of said dilution holes is circumscribed about a second axis of revolution which is not parallel to said first axis of revolution.

3. A liner as claimed in claim 2, wherein:
    said cold side is a first frusto-conical surface having a first conical angle with respect to said first axis,
    said hot side is a second frusto-conical surface having a second conical angle with respect to said first axis, and
    said first and second conical angles have different values.

4. A liner as claimed in claim 3, wherein said dilution hole section thickens in an axially aftwardly direction.

5. A liner as claimed in claim 4, further comprising forward and aft annular cooling nuggets having annular film cooling slots which are open in said axially aftwardly direction.

6. A liner as claimed in claim 1 wherein said shell is machined from a single piece integrally formed near net shape form.

7. A liner as claimed in claim 6 wherein said near net shape form is a forging.

8. A liner as claimed in claim 6 wherein said near net shape form is a casting.

9. A liner as claimed in claim 6 wherein said near net shape form is a centrifugal casting.

10. A liner as claimed in claim 4, further comprising said pockets forming dilution hole bosses between said pockets and said dilution holes extend/through said bosses.

11. A liner as claimed in claim 2, wherein each of said dilution holes is circumscribed about a second axis of revolution which is not parallel to said first axis of revolution.

12. A liner as claimed in claim 11, wherein:
    said cold side is a first frusto-conical surface having a first conical angle with respect to said first axis,
    said hot side is a second frusto-conical surface having a second conical angle with respect to said first axis, and
    said first and second conical angles have different values.

13. A liner as claimed in claim 12, wherein said dilution hole section thickens in an axially aftwardly direction.

14. A liner as claimed in claim 13, further comprising forward and aft annular cooling nuggets having annular film cooling slots which are open in said axially aftwardly direction.

15. An annular gas turbine engine combustor liner comprising:
    an axially extending single piece annular shell circumscribed about a first axis of revolution, said shell having a radially inwardly facing side and a radially outwardly facing side,
    an annular dilution hole section of said shell,
    a plurality of asymmetrical cylindrical dilution holes extending through said section, and
    pockets circumferentially interdigitated between said dilution holes and extending into said shell from said radially outwardly facing side.

16. A liner as claimed in claim 15, wherein each of said dilution holes is circumscribed about a second axis of revolution which is not parallel to said first axis of revolution.

17. A liner as claimed in claim 16, wherein:
    said radially inwardly facing side is a first frusto-conical surface having a first conical angle with respect to said first axis,
    said radially outwardly facing side is a second frusto-conical surface having a second conical angle with respect to said first axis, and
    said first and second conical angles have different values.

18. A liner as claimed in claim 17, wherein said dilution hole section thickens in an axially aftwardly direction.

19. A liner as claimed in claim 18, further comprising forward and aft annular cooling nuggets having annular film cooling slots which are open in said axially aftwardly direction.

20. A liner as claimed in claim 18, wherein said shell is machined from a single piece integrally formed near net shape form.

21. A liner as claimed in claim 20, wherein said near net shape form is a forging.

22. A liner as claimed in claim 20, wherein said near net shape form is a casting.

23. A liner as claimed in claim 22, wherein said near net shape form is a centrifugal casting.

24. A liner as claimed in claim 15 wherein
   said pockets form dilution hole bosses between said pockets, and
   said dilution holes extend through said bosses.

25. A method for making an annular gas turbine engine combustor liner, said method comprising:
   forming a single piece integrally formed near net shape form for an axially extending single piece annular shell circumscribed about a first axis of revolution,
   machining the annular shell having a hot side and a cold side and an annular dilution hole section of the shell,
   drilling a plurality of asymmetrical cylindrical dilution holes extending through the section and
   machining pockets before said drilling of the dilution holes, said machining pockets including machining the Dockets circumferentially interdigitated and centered between where the dilution holes are to be drilled.

26. A method as claimed in claim 25, further comprising machining the pockets to extend into the shell from the cold side such that the pockets form dilution hole bosses between the dilution holes.

27. A method as claimed in claim 26, wherein each of the dilution holes is circumscribed about a second axis of revolution which is not parallel to the first axis of revolution.

28. A method as claimed in claim 27, wherein machining the annular shell includes machining the section to be frusto-conical in shape such that the cold side is a first frusto-conical surface having a first conical angle with respect to said first axis and the hot side is a second frusto-conical surface having a second conical angle with respect to the first axis, and the first and second conical angles have different values.

29. A method as claimed in claim 28 wherein the shell is machined such that the dilution hole section thickens in an axially aftwardly direction.

30. A method as claimed in claim 29, wherein machining the annular shell includes machining forward and aft annular cooling nuggets forward and aft of the dilution hole section and machining annular film cooling slots which are open in said axially aftwardly direction in the nuggets.

31. A method liner as claimed in claim 25 wherein the near net shape form is made by forging.

32. A method liner as claimed in claim 25 wherein the near net shape form is made by casting.

33. A method liner as claimed in claim 32 wherein the near net shape form is made by spin casting.

34. A method as claimed in claim 31, further comprising machining pockets before said drilling of the dilution holes, said machining pockets including machining the pockets circumferentially interdigitated and centered between where the dilution holes are to be drilled, and machining the pockets to extend into the shell from the cold side such that the pockets form dilution hole bosses between the dilution holes.

35. A method as claimed in claim 34, wherein each of the dilution holes is circumscribed about a second axis of revolution which is not parallel to the first axis of revolution.

36. A method as claimed in claim 35, wherein machining the annular shell includes machining the section to be frusto-conical in shape such that the cold side is a first frusto-conical surface having a first conical angle with respect to said first axis and the hot side is a second frusto-conical surface having a second conical angle with respect to the first axis, and the first and second conical angles have different values.

37. A method as claimed in claim 36 wherein the shell is machined such that the dilution hole section thickens in an axially aftwardly direction.

38. A method as claimed in claim 37, wherein machining the annular shell includes machining forward and aft annular cooling nuggets forward and aft of the dilution hole section and machining annular film cooling slots which are open in said axially aftwardly direction in the nuggets.

* * * * *

UNITED STATES PATENT AND TRADEMARK OFFICE
CERTIFICATE OF CORRECTION

PATENT NO.    : 6,553,767 B2                                        Page 1 of 1
DATED         : April 29, 2003
INVENTOR(S)   : Gilbert Farmer et al.

It is certified that error appears in the above-identified patent and that said Letters Patent is hereby corrected as shown below:

Colunm 6,
Line 12, please change "extend/through" to -- extend through --.

Column 7,
Line 19, please change "Dockets" to -- pockets --.

Signed and Sealed this

Twenty-fourth Day of June, 2003

JAMES E. ROGAN
*Director of the United States Patent and Trademark Office*